United States Patent
Hwang et al.

(10) Patent No.: US 9,401,806 B2
(45) Date of Patent: Jul. 26, 2016

(54) DATA SECURITY METHOD USED IN A WIRELESS COMMUNICATION SYSTEM

(71) Applicant: LG ELECTRONICS INC., Seoul (KR)

(72) Inventors: Daesung Hwang, Seoul (KR); Ilmin Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 14/572,570

(22) Filed: Dec. 16, 2014

(65) Prior Publication Data

US 2015/0171994 A1 Jun. 18, 2015

Related U.S. Application Data

(60) Provisional application No. 61/917,308, filed on Dec. 17, 2013.

(51) Int. Cl.
| | |
|---|---|
| *H03M 13/00* | (2006.01) |
| *H04L 9/08* | (2006.01) |
| *H03M 13/23* | (2006.01) |
| *H03M 13/29* | (2006.01) |
| *H04L 1/00* | (2006.01) |

(52) U.S. Cl.
CPC ............. *H04L 9/0875* (2013.01); *H03M 13/23* (2013.01); *H03M 13/2957* (2013.01); *H04L 1/0066* (2013.01); *H04L 2209/34* (2013.01)

(58) Field of Classification Search
CPC . H04L 9/0875; H04L 2209/34; H04L 1/0066; H03M 13/23; H03M 13/2957
See application file for complete search history.

(56) References Cited

U.S. PATENT DOCUMENTS

2008/0101604 A1* 5/2008 Kocher ............ G11B 20/00086
380/210

* cited by examiner

*Primary Examiner* — Sam Rizk
(74) *Attorney, Agent, or Firm* — Lee, Hong, Degerman, Kang & Waimey; Jonathan Kang; Harry Lee

(57) ABSTRACT

The present invention develops a wireless communication transmitting scheme which allows a desired receiver to stably receive data so that data are not tapped by a third party when a transmitter transmits data to the receiver in a wireless scheme. In particular, the third party not a desired receiver taps, a bit error probability of received data is maintained to have about 50%, so that the third party cannot substantially obtain valid data. A suggested scheme of the present invention may transmit security data in a state that a transmitter and a receiver do not have a secret key unlike an existing cryptography.

6 Claims, 14 Drawing Sheets

FIG. 4
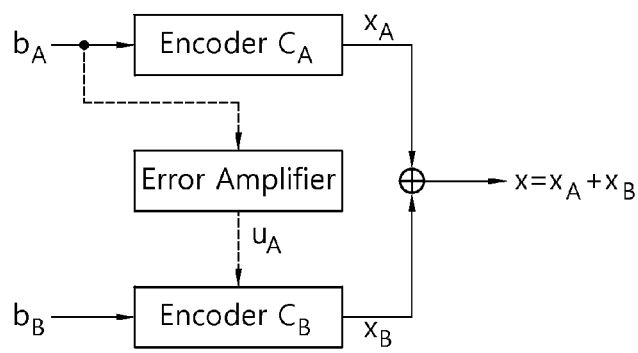
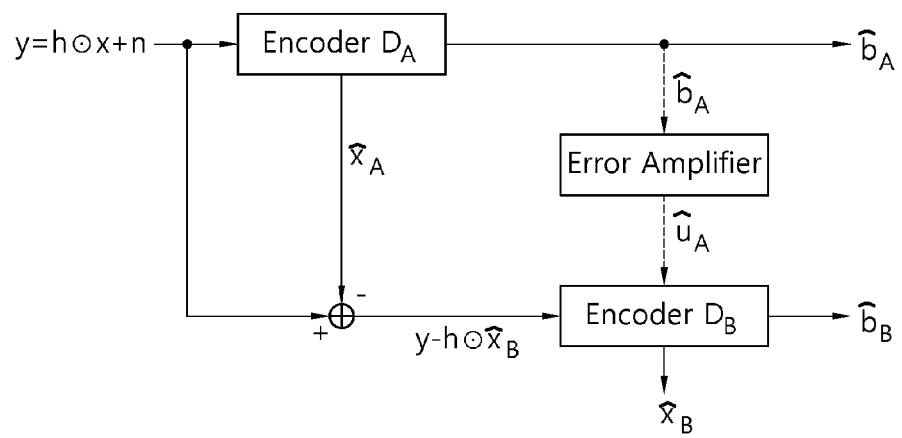

linear feedback shift register(LFSR)

FIG. 8
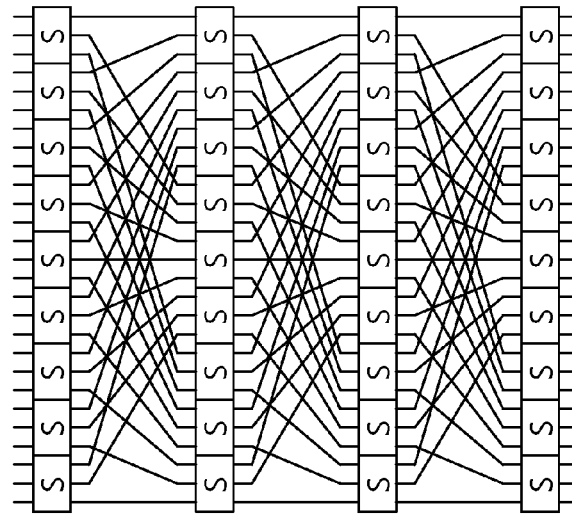
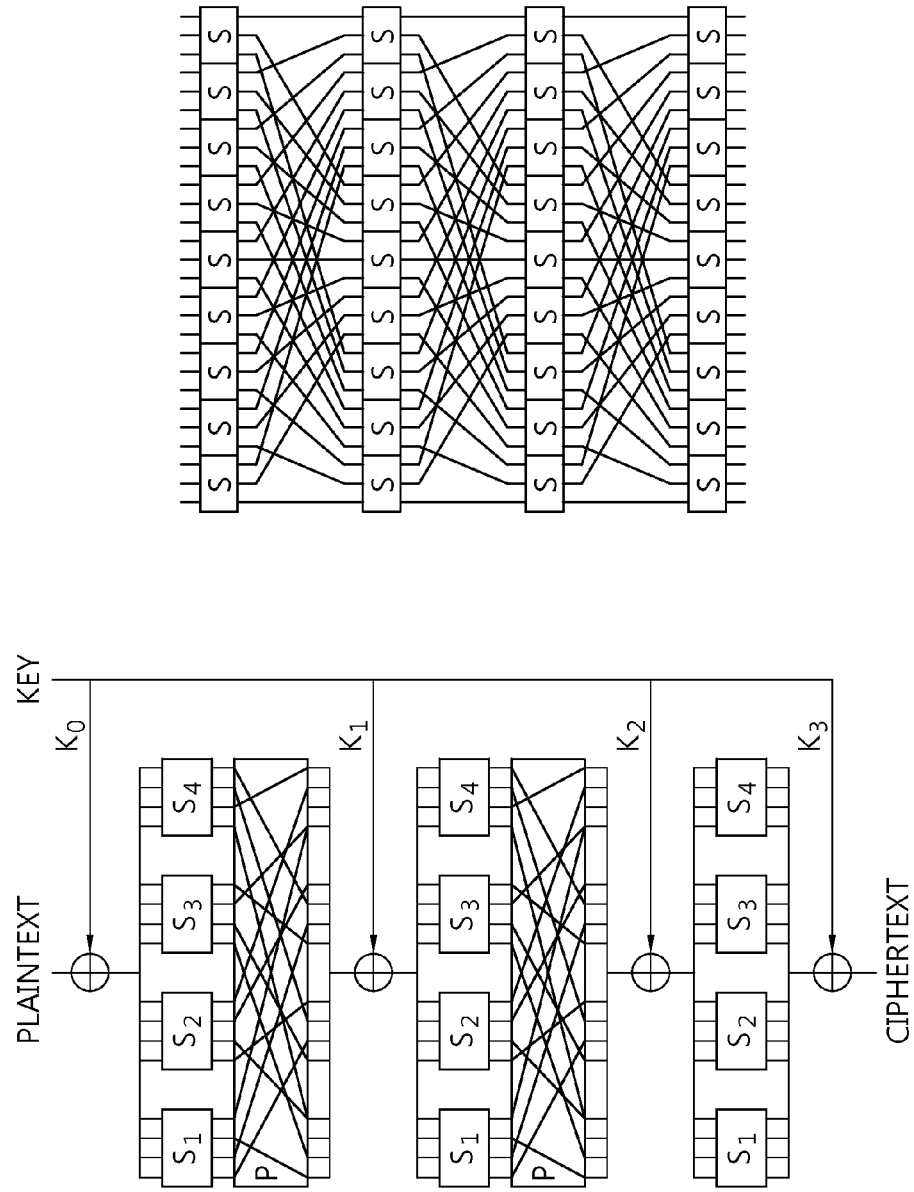

DATA SECURITY METHOD USED IN A
WIRELESS COMMUNICATION SYSTEM

CROSS-REFERENCE TO RELATED APPLICATIONS

Pursuant to 35 U.S.C. §119(e), this application claims the benefit of U.S. Provisional Patent Application No. 61/917,308, filed on Dec. 17, 2013, the contents of which are hereby incorporated by reference herein in their entirety.

TECHNICAL FIELD

The present invention relates to a data security method used in a wireless communication system, and more particularly to a data security method associated with double layer coding.

BACKGROUND ART

It is very important to stably transmit data provided from a transmitter so that an only desired the intended receiver may receive the data without tapping by the unintended receiver. In order to stably transmit the data, the most traditional scheme is to use a secret key. However, such a scheme may be very complicated to generate and manage the secret key and may not be suitable in various wireless systems. In recent years, other security transmission schemes are attracting attention. These refer to a physical layer security. The physical layer security is realized using various coding schemes or communication/signal processing theory in a communication system.

When data are securely transmitted from the transmitter to the intended receiver, it may have different meanings. Security of data in cryptography indicates that data transmitted from the transmitter may be decoded with a relatively low calculation amount. Since the unintended receiver requires a calculation amount of a very high level to decode, the data cannot be substantially decoded. This is security based on a calculation amount. When a calculation amount really required in the unintended receiver is very high, a system is sufficiently safe. However, to this end, complex distribution and management of a secret key are performed. This is not easy operation.

According to an information theory, security means a mutual information amount between the transmitter and the unintended receiver. Assuming that n represents a length of a transmission code, $X^n$ represents a code transmitted from the transmitter, $Z^n$ represents a code received by the unintended receiver, a complete security is expressed by a following condition.

$$I(X^n; Z^n) = 0, \text{ for all } n \quad \text{[Equation 1]}$$

where, I(;) represents a mutual information amount. The complete security is satisfied by only one time pad. To this end, since there is a need for a secret key corresponding to a length of transmission data, it is impossible to satisfy the complete security in most cases. A security at a level lower than the complete security is an information theoretic security in strong sense and is defined as follows.

$$\lim_{n \to \infty} I(X^n; Z^n) = 0 \quad \text{[Equation 2]}$$

Security at the lower level is information theoretic security in weak sense and is defined as follows.

$$\lim_{n \to \infty} \frac{1}{n} I(X^n; Z^n) = 0 \quad \text{[Equation 3]}$$

The information theoretic security in strong sense and the information theoretic security in weak sense has a limitation to obtain security when a length of a code is infinitely long. In real application, the length n of the code is finite, and the length of the code is limited due to a transmission delay and complex problem. In particular, the information theoretic security in weak sense has a problem that a real information output amount may be increased if the length of the code is increased. For example, if $I(X^n; Z^n) = \sqrt{n}$, the information theoretic security in weak sense is satisfied. That is, $$\lim_{n \to \infty} \frac{1}{n} I(X^n; Z^n) = \lim_{n \to \infty} \frac{1}{n} \sqrt{n} = 0.$$

However, in this case, if the length of the code is increased, the information output amount is increased. That is, $\lim_{n \to \infty} I(X^n; Z^n) = \lim_{n \to \infty} \sqrt{n} = \infty$. Up to now, most researches is limited to the information theoretic security in weak sense. The result is applicable to an only relatively simple channel.

Other type of security includes security in a block error probability aspect. When a data transmission rate in the transmitter is less than a channel capacity between the transmitter and the intended receiver and greater than a channel capacity between the transmitter and the unintended receiver, if a length of the code is extremely great (n→∞), a block error probability in the intended receiver converges to zero, and a block error probability in the unintended receiver converges to 1. When the length of the code is finite, a block error probability in the intended receiver does not converge to zero, and a block error probability in the unintended receiver does not exactly converge to 1. However, using random coding exponent and strong converse of Gallager, a block error probability in the intended receiver may be limited to about 0 or less, and a block error probability in the unintended receiver may be limited to about 1 or greater. However, in this manner, security based on the block error probability is not actually and sufficiently safe. For example, consider a case where the length of the code is very long and one bit error occurs among a plurality of bits in a code block. The block error probability is always 1 but the bit error probability is about zero. That is, remaining (n−1) bits except for one among n bits may be exactly decoded by the unintended receiver.

The present invention has been made in an effort to solve the above-described problems associated with prior art, and is aimed at setting a block error probability in the intended receiver to about zero and setting a bit error probability in the unintended receiver to about 0.5 when a length n of a code is finite.

DISCLOSURE OF THE INVENTION

The present invention relates to a data security method by a transmission end using double layer coding in a wireless communication system. The data security method includes acquiring a first bit sequence including data associated with a security key and a second bit sequence including data associated with a payload as input. The data security method further includes setting a transmission rate of the first bit sequence less than channel capacity of an intended receiver in order to prevent a instantaneous bit error from being generated in a first block in the intended receiver with respect to the first bit sequence. The data security method further includes setting the transmission rate of the first bit sequence greater than channel capacity of an unintended receiver in order to generate at least one instantaneous bit error in a second block in the unintended receiver with respect to the first bit sequence. The data security method further includes setting a transmission rate of the second bit sequence less than the channel capacity of the intended receiver in order to prevent the instantaneous bit error from being generated in the first block in the intended receiver with respect to the second bit sequence. The data security method includes setting the transmission rate of the second bit sequence greater than the channel capacity of the unintended receiver in order to generate at least one instantaneous bit error in the second block in the unintended receiver with respect to the second bit sequence. The data security method includes setting an average bit error probability of the at least one instantaneous bit error in the second block to 0.5 using a Substitution-Permutation Network (SPN) if at least one instantaneous bit error is generated in the second block in the unintended receiver. In the method, the first bit sequence is used to decode the second bit sequence. In the method, the average bit error probability is calculated by repeatedly performing a step of passing an input bit including at least one instantaneous bit error in the second block through an S-box (substitution-box) and a P-box (permutation-box) included in the SPN preset times. In the method, the S-box sets an error probability of an output bit of the S-box to 0.5 by amplifying an error of an input bit including at least one instantaneous bit error in the second block. In the method, the P-box interleaves the output bit of the S-box.

EFFECTS OF THE PRESENT INVENTION

When transmitting data in a suggested scheme according to the present invention, an intended receiver may decode data which are transmitted with a bit error probability similar to 0 and an unintended receiver may decode data which are transmitted with a bit error probability similar to 0.5. That is, the unintended receiver cannot obtain meaning data. In particular, the scheme according to the present invention may stably transmit data in a state that a transmitter and the intended receiver do not previously have a secret key unlike an existing cryptography. In addition, unlike many existing physical layer secure schemes, the present invention may stably transmit data by suitably adjusting a length of a code, a transmission rate of data, and transmission power although the length of the code is finite.

BRIEF DESCRIPTION OF THE DRAWINGS

FIG. 4 is a conceptual diagram illustrating a double layer secure coding system using an error amplifier.

FIG. 8 is a conceptual diagram of illustrating an example of a substitution permutation network (SPN).

MODES FOR CARRYING OUT THE PREFERRED EMBODIMENTS

Figure 1:
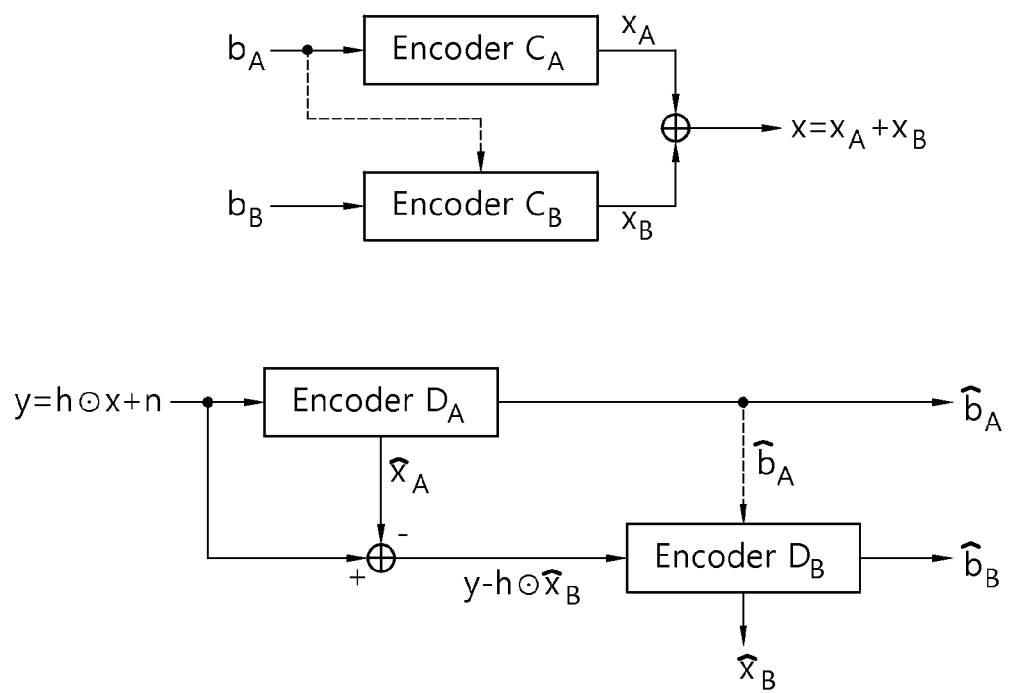
FIG. 1 is a conceptual diagram illustrating the encoders/decoders of a double layer secure coding system.

FIG. 1 is a conceptual diagram illustrating the encoders/decoders of a double layer secure coding system.

It shows double layer secure coding system in detail. Consider following two bit sequences.

$$b_A = (b_1^A, b_2^A, \ldots, b_{K_A}^A) \quad \text{[Equation 4]}$$

$$b_B = (b_1^B, b_2^B, \ldots, b_{K_B}^B) \quad \text{[Equation 5]}$$

where, $b_k^A \in \{0, 1\}$ and $b_k^B \in \{0, 1\}$. A first bit sequence $b_A$ represents random data which does not have special meaning and serves as a secret key. A second bit sequence $b_B$ represents meaning data to be transmitted from the transmitter. An objective of the system is as follows.

i) the intended receiver should decode $b_A$ without error. ii) the unintended receiver generate error of at least one bit to decode $b_A$. iii) A certain receiver may decode $b_B$ without error only when $b_A$ is decoded without error.

Hereinafter, the concept of the double layer secure coding, which is associated with the following two encoders, is explained in detail. A first encoder encodes $b_A$ as follows.

The first encoder includes a code book $C_A$ having $M_A = 2^{K_A}$ codewords. A length of each codeword n and an m-th codeword is expressed by $x_A(m)$: $x_A(m) = [x_{A,1}(m), \ldots, x_{A,n}(m)]$, where $m \in [1, 2^{K_A}]$. Transmission power of each symbol $x_{A,i}(m)$ is given as $P_A$. $E[|x_{A,i}(m)|^2] = P_A$. Each symbol has Gaussian distribution where an average is zero and a variance is $P_A$.

A transmission rate $\bar{R}_A$(bits/channel use) is given as follows.

$$\bar{R}_A = \frac{\log_2 M_A}{n} = \frac{K_A}{n} \text{ (bits/channel use)} \quad \text{[Equation 6]}$$

Alternatively, $P_A$ may be expressed to have nats/channel use unit as follows.

$$R_A = \frac{\ln M_A}{n} = \frac{K_A \ln 2}{n} = \bar{R}_A \ln 2 \text{ (nats/channel use)} \quad \text{[Equation 7]}$$

The code book is open to an encode and all decoders.

The transmission data bit sequence $b_A$ is mapped to a $m_A$ codeword and a next codeword is transmitted.

$$x_A(m) = [x_{A,1}(m_A), x_{A,2}(m_A), \ldots, x_{A,n}(m_A)] \quad \text{[Equation 8]}$$

A second encoder encodes $b_B$ as follows.

The first encoder includes a code book $C_B$ having $M_B = 2^{K_B}$ codewords. A length of each codeword n and an m-th codeword is expressed by $x_B(m)$: $x_B(m)=[x_{B,1}(m), \ldots, x_{B,n}(m)]$, where $m \in [1, 2^{K_B}]$. Transmission power of each symbol $x_{B,i}(m)$ is given as $P_B$. $E[|x_{B,i}(m)|^2]=P_B$. Each symbol $x_{B,i}(m)$ has Gaussian distribution where an average is zero and a variance is $P_B$.

A transmission rate $\bar{R}_B$(bits/channel use) is given as follows.

$$\bar{R}_B = \frac{\log_2 M_B}{n} = \frac{K_B}{n} \text{ (bits/channel use)} \qquad \text{[Equation 9]}$$

Alternatively, $P_B$ may be expressed to have nats/channel use unit as follows.

$$R_B = \frac{\ln M_B}{n} = \frac{K_B \ln 2}{n} = \bar{R}_B \ln 2 \text{ (nats/channel use)} \qquad \text{[Equation 10]}$$

When a code book $C_B$ is configured, the code book is randomized by a first bit sequence $b_A$. That is, only when only $b_A$ is exactly known, the code book $C_B$ may be configured. FIG. 1 illustrates a conceptual diagram of secure encoder/decoder having a double layer structure.

The transmission data bit sequence $b_B$ is mapped to a $m_B$ codeword and a next codeword is transmitted.

$$x_B(m)=[x_{B,1}(m_A), x_{B,2}(m_A), \ldots, x_{B,n}(m_{13})] \qquad \text{[Equation 11]}$$

Hereinafter, the concept of Superposition coding is explained in detail. When $m_A$ and $m_B$ mapped to two transmission bit sequences are given, an actually transmitted signal is given by superposition as follows.

$$\begin{aligned} x &= [x_1, x_2, \cdots, x_n] \\ &= x_A(m_A) + x_B(m_B) \\ &= [x_{A,1}(m_A) + x_{B,1}(m_B), x_{A,2}(m_A) + \\ &\quad x_{B,2}(m_B), \cdots, x_{A,n}(m_A) + x_{B,n}(m_B)] \end{aligned} \qquad \text{[Equation 12]}$$

Further, transmission power $P_T$ of an i-th symbol of the x is given by $$P_T = \mathbb{E}[|x_i|^2] = P_A + P_B \qquad \text{[Equation 13]}$$

A signal received by the intended receiver is expressed as $y_b$, and a signal received by the unintended receiver is expressed as $y_e$.

$$y_b=[y_1^b, y_2^b, \ldots, y_n^b] \qquad \text{[Equation 14]}$$

$$y_e=[y_1^e, y_2^e, \ldots, y_n^e] \qquad \text{[Equation 15]}$$

where $$y_i^b = h_b x_i + \eta_i^b \qquad \text{[Equation 16]}$$

$$y_i^e = h_e x_i + \eta_i^e \qquad \text{[Equation 17]}$$

In this case, $h_b$ and $h_e$ represent channels of the intended receiver and the unintended receiver, respectively. A white Gaussian noise in the intended receiver is expressed as $\eta_i^b$ having a complex Gaussian distribution having an average of zero and a variance of $\sigma_b^2$. A white Gaussian noise in the unintended receiver is expressed as $\eta_i^e$ having a complex Gaussian distribution having an average of zero and a variance of $\sigma_e^2$.

Hereinafter, a decoding operation, which is performed when a length of a code is extremely long, is explained in detail. The underside of FIG. 1 is a conceptual diagram illustrating the decoders of a double layer security coding system. Decoding is achieved by two steps in a receiving end. First, $b_A$ is decoded, and $b_B$ is decoded using this.

A successive interference cancellation is performed in the intended receiver. That is, the $b_A$ is decoded on the assumption that $x_B(m_B)$ is interference. In this case, in order to decode the $b_A$ without error, a transmission rate $R_A$ is limited by $C_b^A$: given as follows.

$$R_A < C_b^A = \ln\left(1 + \frac{P_A |h_b|^2}{P_B |h_b|^2 + \sigma_b^2}\right) \qquad \text{[Equation 18]}$$

If a first bit sequence $b_A$ is decoded without error, the $b_A$ is subtracted from $y_b$ in order to decode the $b_B$. Further, the $b_B$ is decoded by configuring a second code book $C_B$ using the $b_A$. In order to decode the $b_A$ without error, a transmission rate $R_B$ is limited due to $C_b^B$ given as follows.

$$R_B < C_b^B = \ln\left(1 + \frac{P_B |h_b|^2}{\sigma_b^2}\right) \qquad \text{[Equation 19]}$$

The whole channel capacity of the intended receiver is a sum of $C_b^A$ and $C_b^B$.

$$\begin{aligned} C_b &= C_b^A + C_b^B \\ &= \ln\left(1 + \frac{P_T |h_b|^2}{\sigma_b^2}\right) \end{aligned} \qquad \text{[Equation 20]}$$

where, $P_B = P_A + P_B$.

In the same manner as in the intended receiver, the unintended receiver decodes the $b_A$ on the assumption $x_B(m_B)$ is interference. When the unintended receiver decodes the $b_A$, in order to generate errors, a transmission rate $R_A$ is limited due to $C_e^A$ given as follows.

$$R_A > C_E^A = \ln\left(1 + \frac{P_A |h_e|^2}{P_B |h_e|^2 + \sigma_e^2}\right) \qquad \text{[Equation 21]}$$

When the transmission rate is limited as $R_A > C_e^A$, the unintended receiver cannot exactly decode the $b_A$. Accordingly, the unintended receiver may not exactly configure the code book $C_B$. As a result, the $b_B$ cannot be decoded without error. However, the unintended receiver may limit $R_B$ as follows by considering to exactly decode $b_A$ in some scheme.

$$R_B > C_E^B = \ln\left(1 + \frac{P_B |h_e|^2}{\sigma_e^2}\right) \qquad \text{[Equation 22]}$$

As described above, if $R_B$ is limited, although the $b_A$ is decoded without error, the $b_B$ cannot be decoded. In practice, since the $b_A$ cannot be decoded due to a condition of $R_A > C_e^A$, the $b_B$ may be doubly protected.

The whole channel capacity with respect to the unintended receiver is given as follows.

$$C_e = C_e^A + C_e^B \qquad \text{[Equation 23]}$$

$$= \ln\left(1 + \frac{P_T|h_e|^2}{\sigma_e^2}\right)$$

A radio channel is changed according to a time. A case of transmitting data according to a physical layer security is a case where a channel of the intended receiver is better than a channel of the unintended receiver.

$$\frac{|h_b|}{\sigma_b^2} > \frac{|h_e|}{\sigma_e^2} \qquad \text{[Equation 24]}$$

If the above condition is satisfied, following two conditions with respect to some $P_A$ ($0 \leq P_A \leq P_T$)

$$C_e^A < C_b^A \qquad \text{[Equation 25]}$$

$$C_e^B < C_b^B \qquad \text{[Equation 26]}$$

Accordingly, the transmission rate $R_A$ may be determined as follows.

$$C_e^A < R_A < C_b^A \qquad \text{[Equation 27]}$$

A length $K_A$ of a first bit sequence $b_A$ is limited from the condition $C_e^A < R_A < C_b^A$.

$$K_A < K_A^{max} = \frac{n}{\ln 2} C_b^A = \frac{n}{\ln 2} \ln\left(1 + \frac{P_A|h_b|^2}{(P_T - P_A)|h_b|^2 + \sigma_b^2}\right) \text{(bits)} \qquad \text{[Equation 28]}$$

$$K_A > K_A^{min} = \frac{n}{\ln 2} C_e^A = \frac{n}{\ln 2} \ln\left(1 + \frac{P_A|h_e|^2}{(P_T - P_A)|h_e|^2 + \sigma_e^2}\right) \text{(bits)} \qquad \text{[Equation 29]}$$

If the transmission rate $R_A$ is limited to $R_A > C_e^A$ the unintended receiver may not decode $b_A$ without error. However, $R_B$ may be further limited on the assumption that the unintended receiver decodes $b_A$ without error.

$$C_e^B < R_B < C_b^B \qquad \text{[Equation 30]}$$

In this case, a second bit sequence $b_B$ is doubly protected.

In order to provide a sufficient security, a small value is given to a length $K_A$ of $b_A$. When the unintended receiver does not know $b_A$, the number of cases to be attempted for decoding by the unintended receiver is $2^{K_A}$. For example, in a data encryption standard (DES), a length of a secret key 56 bits. In an advanced encryption standard (AES), a length of the secret key is 128 bits, 192 bits, or 256 bits. In this case, the number of all possible cases is $2^{56} \approx 7.6 \times 10^{16}$, $2^{128} \approx 3.4 \times 10^{38}$, $2^{56} \approx 6.2 \times 10^{57}$, and $2^{256} \approx 1.1 \times 10^{77}$.

If $K_A$ is determined as a proper value, $R_A$ is determined by $$R_A = \frac{K_A \ln 2}{n}.$$

Accordingly, an upper limit and a lower limit of transmission power $P_A$ may be determined from a following condition.

$$R_A < C_b^A = \ln\left(1 + \frac{P_A|h_b|^2}{(P_T - P_A)|h_b|^2 + \sigma_b^2}\right) \qquad \text{[Equation 31]}$$

$$R_A < C_e^A = \ln\left(1 + \frac{P_A|h_e|^2}{(P_T - P_A)|h_e|^2 + \sigma_e^2}\right) \qquad \text{[Equation 32]}$$

An upper limit and a lower limit of transmission power $P_A$ is given from the above condition as follows.

$$P_A > P_A^{min} = (1 - e^{-R_A})\left(P_T + \frac{\sigma_b^2}{|h_b|^2}\right) \qquad \text{[Equation 33]}$$

$$P_A > P_A^{max} = (1 - e^{-R_A})\left(P_T + \frac{\sigma_e^2}{|h_e|^2}\right) \qquad \text{[Equation 34]}$$

Finally, $P_B$ is given as follows.

$$P_B = P_T - P_A \qquad \text{[Equation 35]}$$

Hereinafter, a decoding operation, which is performed when a length of a code is finite.

When a length of a code is finite, a random coding theory of Gallager is used. When a first bit sequence $b_A$ is decoded, a block decoding error probability in the intended receiver is always less than a given $P_{err,A}^{U,b}(R_A)$ as follows.

$$P_{err,A}^{U,b}(R_A) = \qquad \text{[Equation 36]}$$

$$\exp\left(-n\left(-\ln\left(1 + \frac{P_A|h_b|^2}{(P_B|h_b|^2 + \sigma_b^2)(1 + \rho_A)}\right)^{-\rho_A} - \rho_A R_A\right)\right)$$

Further, if strong converse of an information theory is used, when the first bit sequence $b_A$ is decoded, a block decoding error probability in the unintended receiver is always greater than a given $P_{err,A}^{L,e}(R_A)$ as follows.

$$P_{err,A}^{L,e}(R_A) = 1 - \qquad \text{[Equation 37]}$$

$$\exp\left(-n\left(-\ln\left(1 + \frac{P_A|h_e|^2}{(P_B|h_e|^2 + \sigma_e^2)(1 + \rho'_A)}\right)^{-\rho'_A} - \rho'_A R_A\right)\right)$$

Hereinafter, a power allocation when RA is given is explained in detail. If $K_A$ is determined as a proper value, $R_A$ is determined by $$R_A = \frac{K_A \ln 2}{n}.$$

Further, an upper limit $P_{err,A}^{U,b}(R_A)$ of a block decoding error probability of the first bit sequence is limited to a certain constant value, and an upper limit $P_{err,A}^{L,e}(R_A)$ of a block decoding error probability of the second bit sequence is limited to a certain constant value.

$$P_{err,A}^{U,b}(R_A) \leq \mathcal{P}_{err,A}^{U,b} \qquad \text{[Equation 38]}$$

$$P_{err,A}^{L,e}(R_A) \geq \mathcal{P}_{err,A}^{L,e} \qquad \text{[Equation 39]}$$

An upper limit and a lower limit of transmission power $P_A$ is given from the above condition as follows.

$$P_A \geq P_A^{min} = \qquad\qquad\qquad\qquad\qquad\qquad \text{[Equation 40]}$$
$$\left(P_T + \frac{\sigma_b^2}{|h_b|^2}\right)\left(1 + \frac{1}{(1+\rho_A)\left(\left(\mathcal{P}_{err,A}^{U,b}\right)^{-\frac{1}{n\rho_A}}e^{R_A}-1\right)}\right)^{-1}$$

$$P_A \leq P_A^{max} = \qquad\qquad\qquad\qquad\qquad\qquad \text{[Equation 41]}$$
$$\left(P_T + \frac{\sigma_e^2}{|h_e|^2}\right)\left(1 + \frac{1}{(1+\rho_A')\left(\left(1-\mathcal{P}_{err,A}^{L,e}\right)^{-\frac{1}{n\rho_A'}}e^{R_A}-1\right)}\right)^{-1}$$

In order to efficiently use transmission power to the highest degree, $P_A$ is determined as follows.

$$P_A = P_A^{min} \qquad\qquad\qquad \text{[Equation 42]}$$

Remaining power is used as $P_B$.

$$P_B = P_T - P_A^{min} \qquad\qquad\qquad \text{[Equation 43]}$$

The second bit sequence $b_B$ is decoded in the intended receiver without error. When the second bit sequence $b_B$ is decoded in the unintended receiver, $R_B$ is set to satisfy a following condition so that an error is always generated.

$$P_{err,B}^{U,b}(R_B) \leq \mathcal{P}_{err,B}^{U,b} \qquad\qquad \text{[Equation 44]}$$

$$P_{err,B}^{L,e}(R_B) \leq \mathcal{P}_{err,B}^{L,e} \text{ where} \qquad \text{[Equation 45]}$$

$$P_{err,B}^{U,b}(R_B) = \exp\left(-n\left(-\ln\left(1+\frac{P_B|h_b|^2}{\sigma_b^2(1+\rho_B)}\right)^{-\rho_B} - \rho_B R_B\right)\right) \qquad \text{[Equation 46]}$$

$$P_{err,B}^{L,e}(R_B) = 1 - \exp\left(-n\left(-\ln\left(1+\frac{P_B|h_e|^2}{\sigma_e^2(1+\rho_B')}\right)^{-\rho_B'} - \rho_B' R_B\right)\right) \qquad \text{[Equation 47]}$$

Based on the above condition, a transmission rate $R_B$ of the second bit sequence is limited as follows.

$$R_B \leq \frac{1}{n\rho_B}\ln \mathcal{P}_{err,B}^{U,b} + \ln\left(1+\frac{P_B|h_b|^2}{\sigma_b^2(1+\rho_B)}\right) \qquad \text{[Equation 48]}$$

$$R_B \geq \frac{1}{n\rho_B'}\ln\left(1-\mathcal{P}_{err,B}^{L,e}\right) + \ln\left(1+\frac{P_B|h_e|^2}{\sigma_e^2(1+\rho_B')}\right) \qquad \text{[Equation 49]}$$

Hereinafter, a block error probability and a bit error probability is explained in detail. A condition $P_{err,A}^{U,b}(R_A) \leq \mathcal{P}_{err,A}^{U,b}$ and $P_{err,B}^{U,b}(R_B) \leq \mathcal{P}_{err,B}^{U,b}$ for the intended receiver is satisfied. The second bit sequence $b_B$ is decoded to a sufficient small block error probability in the intended receiver by setting $P_{err,A}^{U,b}$ and $P_{err,B}^{U,b}$ to a sufficient small value.

A condition $P_{err,A}^{L,e}(R_A) \geq \mathcal{P}_{err,A}^{L,e}$ and $P_{err,B}^{L,e}(R_B) \geq \mathcal{P}_{err,B}^{L,e}$ for the unintended receiver is satisfied. The second bit sequence $b_B$ is decoded to a block error probability sufficiently close to 1 in the unintended receiver by setting $P_{err,A}^{L,e}$ and $P_{err,B}^{L,e}$ to about 1.

If the block error probability is very small, the bit error probability is very small. That is, if the block error probability converges to zero, the bit error probability also converges to zero. However, although the block error probability is increased to about 1, the bit error probability may not be increased to about 0.5. For example, each block includes only one bit error, the block error probability is always 1. However, as the length of a block is increased, the bit error probability converges to zero. In this case, remaining bits of a block except for one bit are decoded without error. That is, the data may not be stably transmitted by only increasing the block error probability in the unintended receiver.

Figure 2:
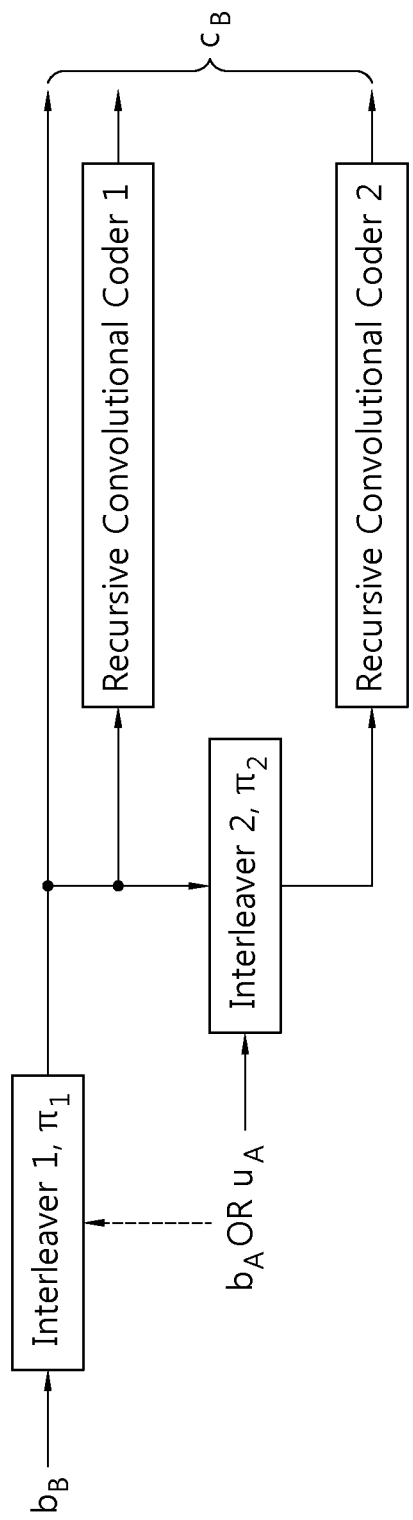
FIG. 2 is a conceptual diagram illustrating a security turbo coding.

FIG. 2 is a conceptual diagram illustrating a security turbo coding. In this case, input bits are randomized according to a first interleaver $\pi_1$, and one different interleaver $\pi_2$ between two recursive convolutional codes exists in a common turbo code. Such a structure is a turbo coding structure previously suggested from cryptography. It is assumed that only the transmitter and the intended receiver include a secret key. The transmitter encrypts two interleavers $\pi_1$ and $\pi_2$ using a secret key in a transmission end. The intended receiver decode the two interleavers $\pi_1$ and $\pi_2$ using the same secret key in a reception end. Since the unintended receiver does not include the secret key, the unintended receiver cannot decode the two interleavers and accordingly cannot decode data. Such a structure has a problem in that the transmitter and the intended receiver should previously share the secret key. That is, if there is no previously shared secret key, the above turbo coding cannot be used.

According to the present invention, the transmitter uses the turbo coding structure shown in FIG. 2 but the transmitter and the intended receiver do not use a shared secret key. The transmitter uses the first bit sequence $b_A$ in order to encrypt two interleavers $\pi_1$ and $\pi_2$ of a given secure turbo coding. The intended receiver uses the decoded first bit sequence $b_A$ in order to decode the two interleavers $\pi_1$ and $\pi_2$. The intended receiver may decode the second bit sequence $b_B$. However, unlike the intended receiver, since the unintended receiver cannot decode the first bit sequence $b_A$ without error, the unintended receiver cannot decode the two interleavers $\pi_1$ and $\pi_2$. As a result, the unintended receiver cannot decode the second bit sequence $b_B$.

If a length of an interleaver is L, the total number of randomizing the interleaver is given as $L \times (L-1) \times \ldots \times 2 \times 1 = L!$. As described above, a bit number capable of expressing the number of L! cases is $\lceil \log_2 L! \rceil$. In this manner, randomizing the interleaver has a problem in that the number of necessary bits is very many ($\lceil \log_2 L! \rceil$ value is greater than L).

In order to reduce the bit number to randomize the interleaver, an active interleaving scheme is considered. If a Hamming weight of a bit sequence input to the interleaver is w, the number of cases where a given output bit becomes different through the interleaver is not L! but is given as $$\binom{L}{w}$$

as follow.

$$\binom{L}{w} = \frac{L!}{(L-w)!w!}, w = 0, 1, \cdots, L \qquad \text{[Equation 50]}$$

In this case, the bit number required to represent the number of cases of $$\binom{L}{w}$$

is $$\left\lceil \log_2 \binom{L}{w} \right\rceil.$$

That is, if interleaving is dynamically randomized according to a Hamming weight of an input bit sequence, the number of required bits is significantly reduced.

A scheme of randomizing the interleaver has a disadvantage in that the number of cases where an output bit of the interleaver is different when the Hamming weight of an input bit sequence of the interleaver is very high or very low. For example, if the Hamming weight of the input bit sequence of the interleaver is zero or L, an output bit sequence of the interleaver is exactly equal to the input bit sequence.

$$\binom{L}{W(b)=0} = \binom{L}{W(b)=L} = 1 \quad \text{[Equation 51]}$$

where, W(b) represents a Hamming weight of a bit sequence b. In this case, the unintended receiver exactly knows data of the transmitter.

In order to solve such a problem, the present invention performs an operation of changing a Hamming weight of an input bit as follows. First, it is assumed that a length L of the interleaver is a multiple of four.

Figure 3:
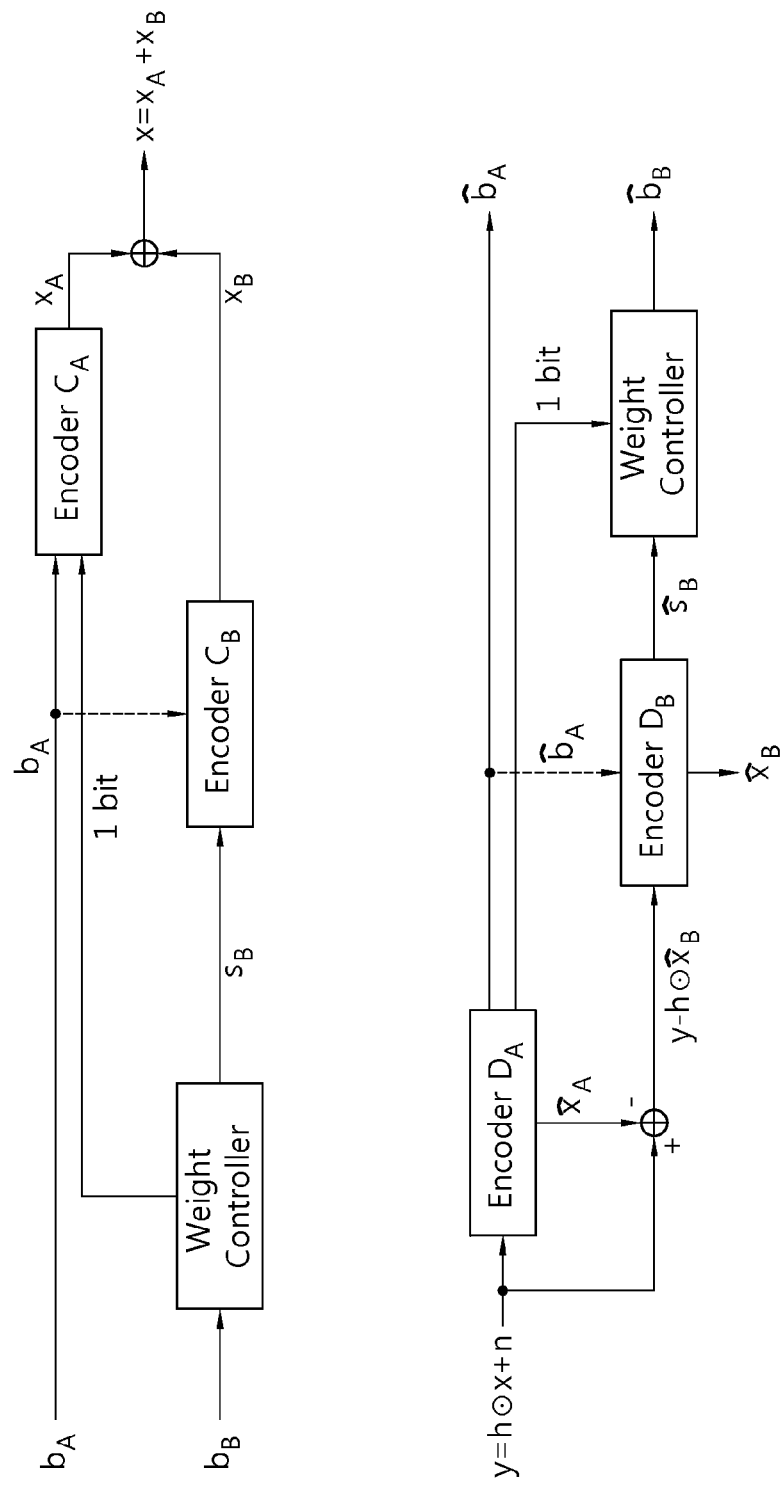
FIG. 3 is a conceptual diagram illustrating a double layer secure coding system using a Hamming weight adjustment scheme.

FIG. 3 is a conceptual diagram illustrating a double layer secure coding system using a Hamming weight adjustment scheme.

Hamming weight adjustment scheme: when a bit sequence b is given, the bit sequence is not directly input to the interleaver. A bit sequence b' passing through a following process is input to the interleaver.

If W(b)≤L/4 or W(b)≤3L/4, the b' is given as follows.

$$b' = b \oplus b_{10} \quad \text{[Equation 52]}$$

where, $$b_{10} = [1,0,1,0,\ldots,1,0] \quad \text{[Equation 53]}$$

If L/4<W(b)<3L/4, the b' is given as follows.

$$b' = b \quad \text{[Equation 54]}$$

In order to represent the cases, information of 1 bit is required, and the information of 1 bit is transmitted to the intended receiver from the transmitter, and the information is attached to a final part of the first bit sequence b' to be transmitted.

In the above scheme, an input bit sequence is converted, a Hamming weight of the converted bit sequence b' may be mathematically expressed as follows.

$$\frac{L}{4} \leq W(b') \leq \frac{3L}{4} \quad \text{[Equation 55]}$$

That is, a case where the Hamming weight is extremely small or large is prevented.

Hereinafter, a bit error amplification is explained in detail. As described above, the intended receiver may prevent a block decoding error from being generated and the unintended receiver may generate a block decoding error by adjusting a transmission rate and transmission power. However, sufficient security of data transmission cannot be achieved by only generating block decoding in the unintended receiver. In practice, in order to accomplish data security, a bit error probability should be controlled to about 0.5. This section considers that an error is extended or amplified to a whole block if an error occurs in one bit in a block.

FIG. 4 is a conceptual diagram illustrating a double layer secure coding system using an error amplifier. A first bit sequence $b_A$ in a transmission end (further, a first bit sequence $\hat{b}_A$ decoded in a reception end) is input to a bit error amplifier. A output $u_A$ in a bit error amplifier of a transmission end (further, an output $\hat{u}_A$ in the bit error amplifier of a reception end) is used to randomize a code book $C_B$ for transmitting (receiving) a second bit. When the secure turbo code is used, the output $u_A$ is used to randomize the two interleavers $\pi_1$ and $\pi_2$.

Figure 5:
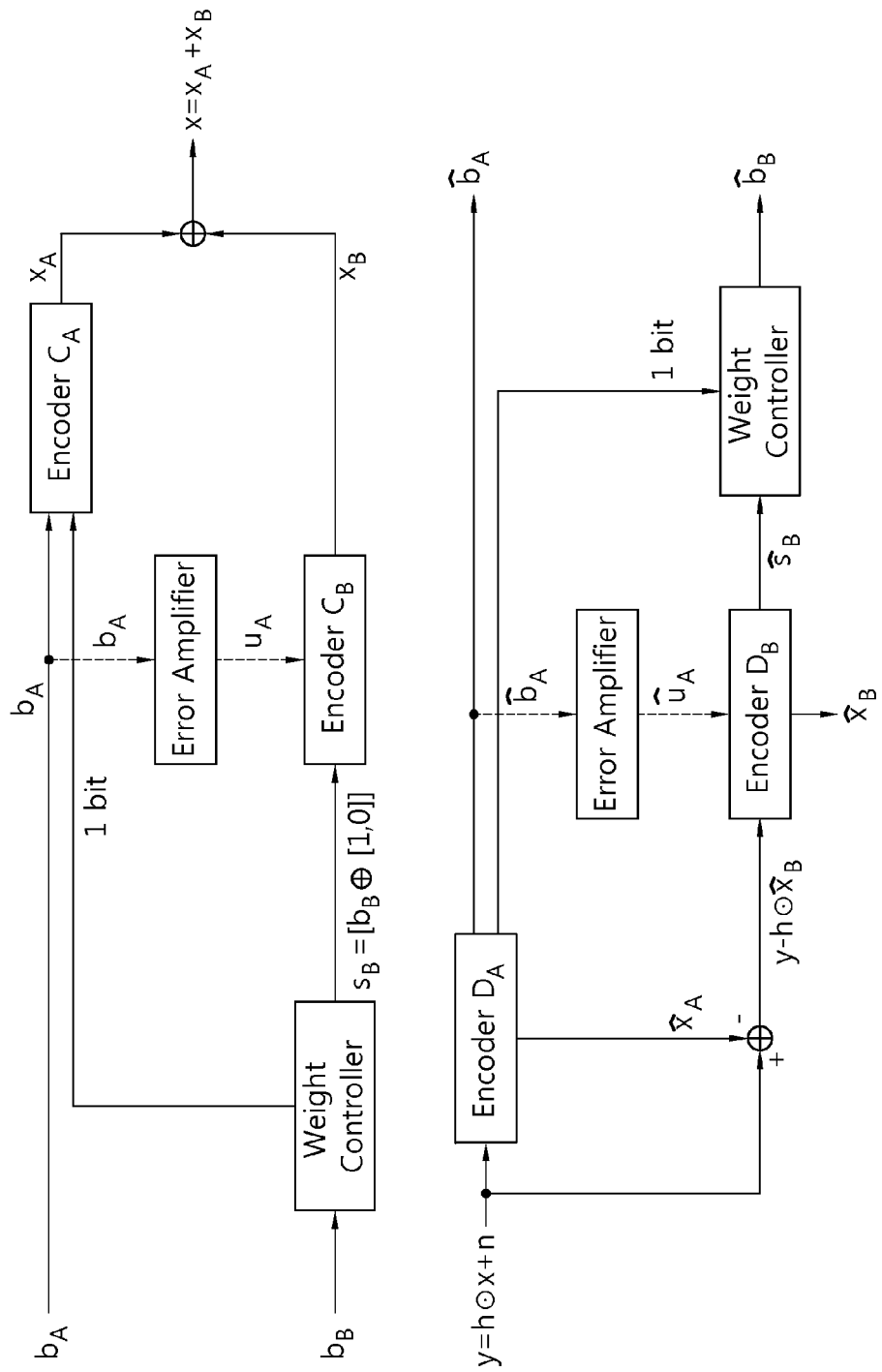
FIG. 5 is a conceptual diagram illustrating a double layer secure coding system using a Hamming weight adjustment scheme and an error amplifier.

FIG. 5 is a conceptual diagram illustrating a double layer secure coding system using a Hamming weight adjustment scheme and an error amplifier. A double layer secure system using both of the Hamming weight adjustment scheme and the bit error amplifier may be configured.

Hereinafter, various bit error amplification schemes are considered below.

Figure 6:
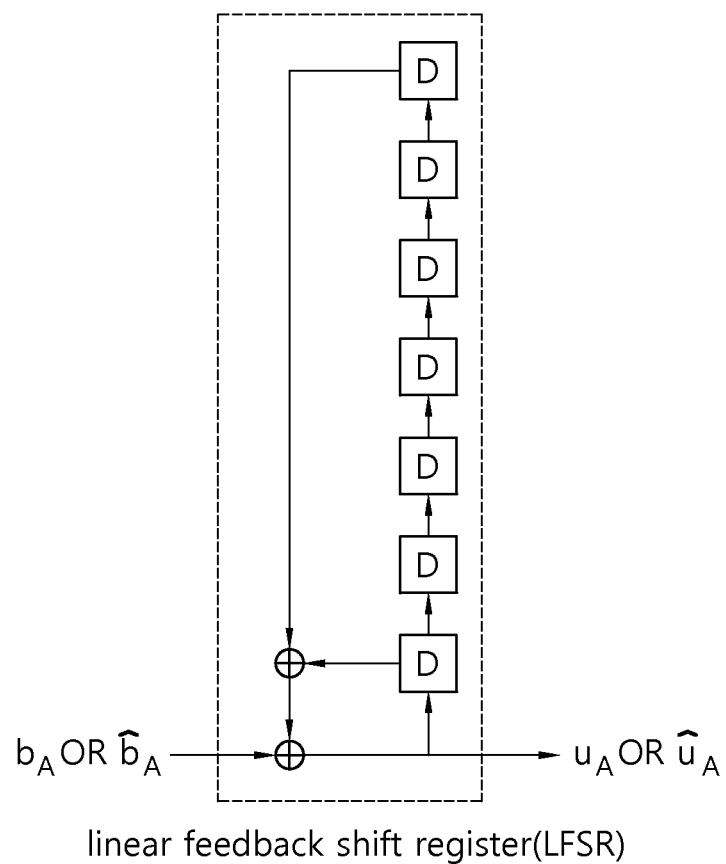
FIG. 6 is a conceptual diagram of illustrating an example of bit error amplification using LFSR, a characteristic function $\psi(x)=x^7+x+1$.

FIG. 6 is a conceptual diagram of illustrating an example of bit error amplification using LFSR, a characteristic function $\psi(x)=x^7+x+1$. For bit error amplification, linear feedback shift registers (LFSRs) may be used. As described above, the LFSR may be used as a bit error amplifier. In this case, one input bit error generates an output bit error having the same number as that of a total sum of weights of the characteristic function.

Figure 7:
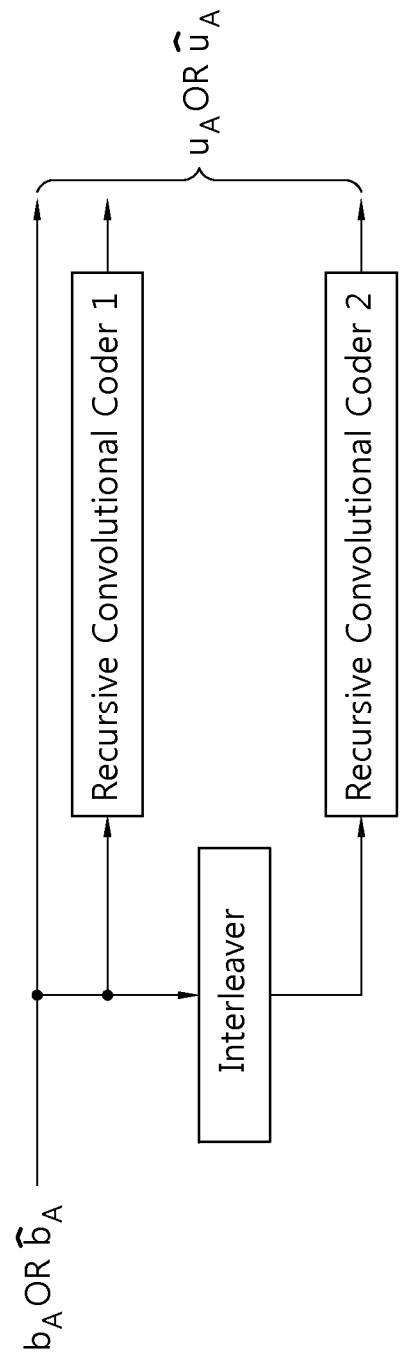
FIG. 7 is a conceptual diagram of illustrating an example of bit error amplification using a turbo code.

FIG. 7 is a conceptual diagram of illustrating an example of bit error amplification using a turbo code.

For bit error amplification, various channel coding schemes may be used. For example, a recursive convolution code may be used or a turbo code may be used. The turbo code may be considered as a time-varying infinite impulse response (IIR) filter and may efficiently amplify a bit error.

A systematic research in bit error amplification has been performed in cryptography. The S-box is used in a plurality standard encryptors such as a DES or an AES. The DES uses a 6×4 S-box having an input of 6 bits and an output of 4 bits, and the AES uses a 8×8 S-box having an input/output of 8 bits. If the S-boxes has the same input/output bit number and an input bit and an output bit forms one-to-one mapping, the S-box refers to an invertible S-box and S-boxes used for AES refer to an invertible S-box.

The S-box has various important characteristics. One characteristic is an avalanche property. If one or more bit errors occurs in an input bit of the S-box, all output bits of the S-box is changed with a probability of 50%. That is, in this case, an average bit error probability in an output end of the S-box is 0.5. The avalanche property may be well satisfied by simulating using the 8×8 S-box of the AES.

Hereinafter, a bit error amplification using substitution-permutation network (SPN) is explained in detail.

FIG. 8 is a conceptual diagram of illustrating an example of a substitution permutation network (SPN).

Although the S-box satisfies the avalanche property, it is very difficult to make an S-box having great input and output. It is not easy to configure an S-box having an input of 8 bits or greater. In order to process many input bits for solving the problem, an SPN is used in the cryptography. In the SPN, input bits pass through a plurality of S-boxes which are connected in parallel. Output bits of the S-boxes pass through a permutation (P)-box. One of simple methods of configuring the P-box interleaves output bits of the S-box as illustrated in drawing. Bits passing through the P-box again pass through the S-box and the P-box. Such a repeated operation refers to a round. A DES used in a real cryptography uses SPN of 16 rounds and the AES uses a SPN concept of 10 rounds. In particular, in the cryptography, as shown in the left side of FIG. 8, a secret key is applied to the SPN to be used. According to the present invention, since the transmitter and the intended receiver do not include a secret key, when an SPN is used, as an example illustrated in the right side of FIG. 8, the secret key is not used. The right side of FIG. 8 illustrates an SPN having 27 input bits and 4 rounds. If the S-boxes used for the SPN are invertible S-box, the SPN may be inverted. That is, entire input bits and output bits of the SPN are provided in one-to-on correspondence.

It may be understood through real simulation that the SPN has the avalanche property. If an error occurs in one or more bits in an input end, the bit error may extend to the whole output bit. That is, all output bits are changed with a probability of about 0.5 and an average output bit error probability is about 0.5. In order to obtain the avalanche property, an SPN having the sufficient number of rounds is used. In particular, if a length of an input bit sequence is increased (if the number of input bits is increased), the SPN should have more rounds. In general, the SPN having 10 or more rounds represents the avalanche property with respect to a sufficient large input bit. When many input bits are given, in order to represent the avalanche property while having the smaller number of rounds, the P-box may be configured using linear transformation as follows. It is assumed that $b=(b_1, \ldots, b_n)$ is an input bit of the P-box, and $\hat{b}=(\hat{b}_1, \ldots, \hat{b}_n)$ is an output bit of the P-box. First, a U is calculated using the whole input bit as follows.

$$U = b_1 \oplus b_2 \oplus \ldots \oplus b_n \quad \text{[Equation 56]}$$

Next, $\hat{b}$ is generated by performing XOR calculation and U and each bit of an input.

$$\hat{b} = (\hat{b}_1, \cdots, \hat{b}_n) \quad \text{[Equation 57]}$$
$$= (b_1 \oplus U, \cdots, b_n \oplus U)$$

A $\tilde{b}$ is generated by permutating bits of the $\hat{b}$.

$$\tilde{b} = \pi(\hat{b}) \quad \text{[Equation 58]})$$

where, $\pi(\cdot)$ represents a random permutation. In this manner, if the P-box is configured, when the number of input bits of the SPN is great, the avalanche property may be efficiently represented by using only the smaller number of rounds.

Figure 9:
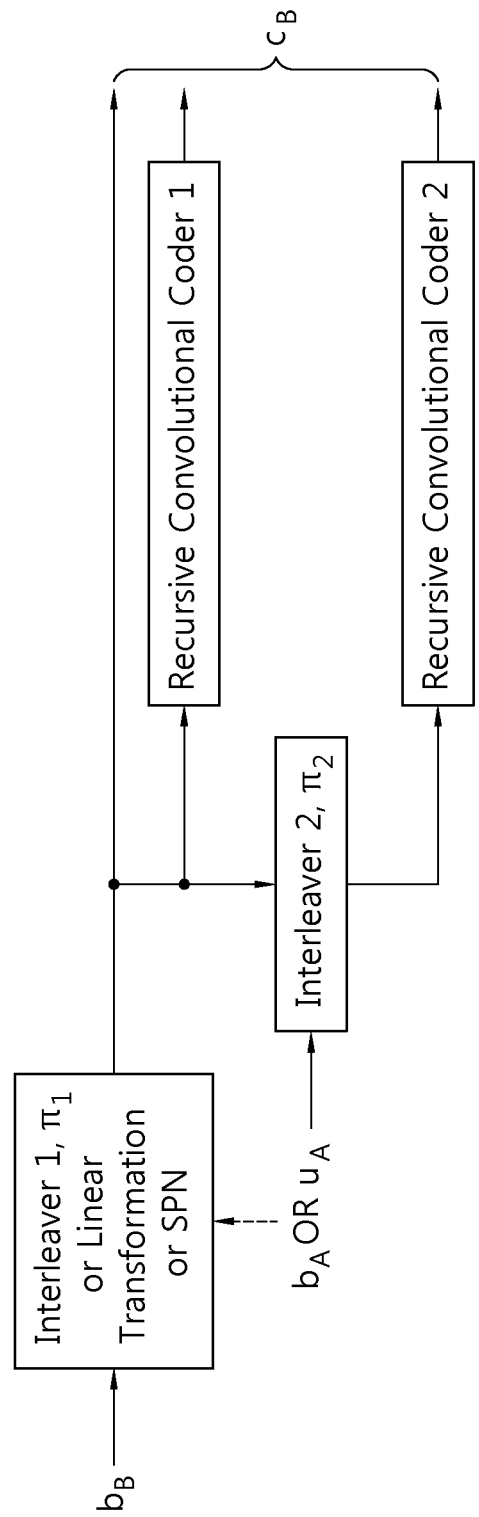
FIG. 9 is a conceptual diagram illustrating a security turbo code using linear transformation or SPN.

FIG. 9 is a conceptual diagram illustrating a security turbo code using linear transformation or SPN.

Using the SPN, the security may be reinforced by transforming the secure turbo coding given in FIG. 2. That is, the transmitter uses linear transformation or SPN instead of an interleaver $\pi_1$ through which input bits pass. The SPN provides security of a level higher than the interleaver. The intended receiver may decode original data by inverting the SPN.

Figure 10:
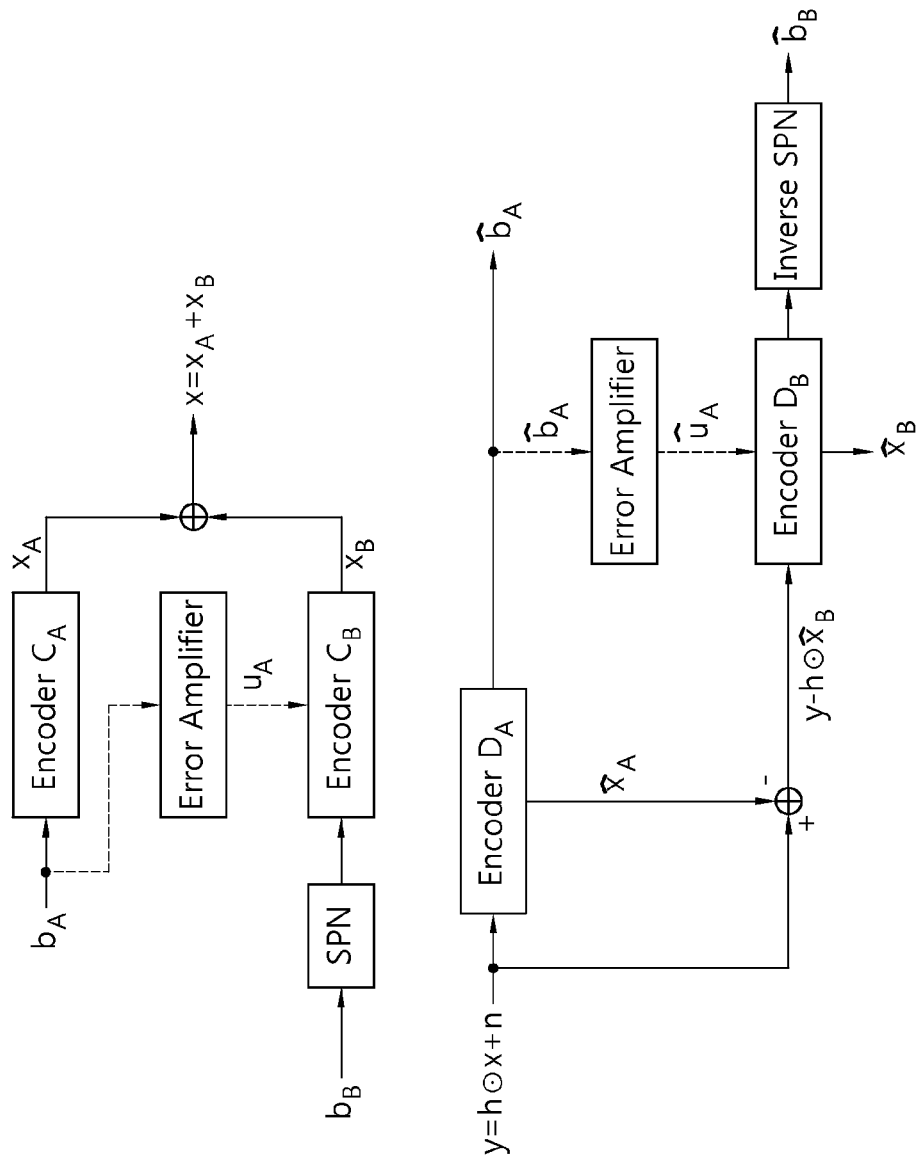
FIG. 10 is a conceptual diagram illustrating a double layer secure coding system including an error amplifier (SPN) used in two layers.

FIG. 10 is a conceptual diagram illustrating a double layer secure coding system including an error amplifier (SPN) used in two layers.

Further, the security of the second bit sequence $b_B$ may be improved using the SPN in the above double layer secure coding system. First, in order to randomize the code book $C_B$, when using the first bit sequence $b_A$, a bit error amplifier is used. That is, a bit error amplified $u_A$ is used to configure the code book $C_B$ in a transmission end. A reception end uses $\hat{u}_A$ obtained by bit error amplifying the decoded $\hat{b}_A$ in order to configure the code book $C_B$. In addition, in order to improve security of the second bit sequence $b_B$, the transmitter uses the SPN and the intended receiver uses inverse SPN. In a case of the unintended receiver, error of at least one bit occurs in $b_A$ and $b_B$. Since the bit error is amplified according to the error amplifier and the SPN, data may not be received without error. A really decoded average bit error probability is about 0.5.

Figure 11:
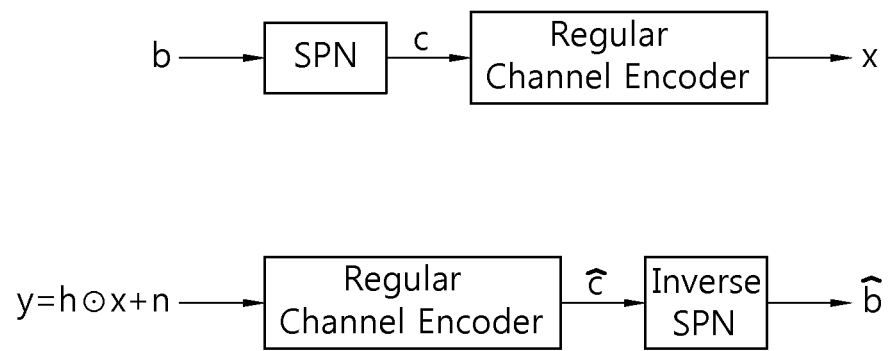
FIG. 11 is a conceptual diagram illustrating the encoders/decoders of a single layer security coding system using SPN.

FIG. 11 is a conceptual diagram illustrating the encoders/decoders of a single layer security coding system using SPN.

This section suggests a single layer secure coding scheme using an SPN representing the avalanche property. The suggested single layer secure coding may include all types of error correction codes. That is, as suggested in a previous section, a special interleaver or a secure turbo code with SPN, all types of general error correction codes may be used. For example, a general turbo code, a low density parity check (LDPC) code, or a repeat accumulate (RA) code may be used. The scheme is operated as follows.

In the single layer security, only one bit sequence b is transmitted by the transmitter. In this case, as analyzed in a previous section, the transmission rate R is controlled to be less than a channel capacity $C_b$ of the intended receiver and be greater than a channel capacity $C_e$ of the unintended receiver.

$$R < C_b \quad \text{[Equation 59]}$$

$$R > C_e \quad \text{[Equation 60]}$$

If a length of a code is infinite, a block decoding error probability of the intended receiver converges to zero, and a block decoding error probability of the unintended receiver converges to 1. Actually, when the length of the code is finite, the block decoding error probability does not exactly converge to 0 or 1. A block decoding error probability of the intended receiver has a sufficient small value similar to zero and a block decoding error probability of the unintended receiver has a sufficient large value similar to 1 by suitably increasing transmission power and the length of the code.

$$Pr(c \neq \hat{c}) \approx 0 \text{ at the intended receiver} \quad \text{[Equation 61]}$$

$$Pr(c \neq \hat{c}) \approx 1 \text{ at the unintended receiver} \quad \text{[Equation 62]}$$

where, the c represents a transmitted codeword and the $\hat{c}$ represents a decoded codeword.

If the codeword is decoded, the bit sequence passes through the SPN. In a case of the intended receiver, since the block decoding error probability is very small, in almost all cases, $c=\hat{c}$ is satisfied. Since there is no error in an input end of the SPN, an error is not amplified and an average bit error probability is given to about zero.

$$P_{ber}^{b} \approx 0 \quad \text{[Equation 63]}$$

In a case of the unintended receiver, since the block decoding error probability is very large, in almost all cases, $c \neq \hat{c}$ is satisfied. That is, in almost all cases, at least one bit error occurs in an input end of the SPN, and the bit error is amplified due to an avalanche property so that an average bit error probability in an output end of the SNP is about 0.5.

$$P_{ber}^{e} \approx 0.5 \quad \text{[Equation 64]}$$

Figure 12:
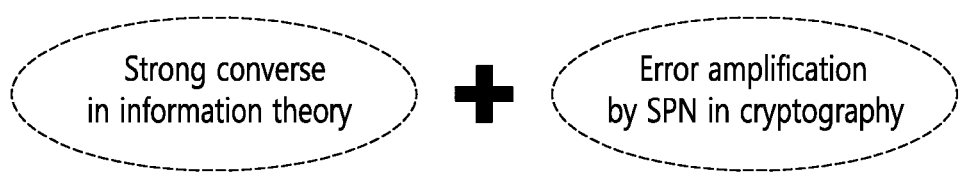
FIG. 12 is a conceptual diagram of illustrating a basic idea of a single layer security coding system using SPN.

FIG. 12 is a conceptual diagram of illustrating a basic idea of a single layer security coding system using SPN.

Unlike an existing research, the important difference of the single layer secure coding according to the present invention is that no secret key is generated/distributed, and the transmitter and the intended receiver do not require the secret key. A basic concept of the present invention generates at least one bit error in a block by transmitting data with a transmission rate higher than a channel capacity of the unintended receiver based on an information theory (refers to block error) and then amplifies an output bit error to be about 0.5 using the avalanche property of SPN used in cryptography. That is, an average bit error probability is about 0.5. Meanwhile, in case of the intended receiver, since an error does not occur in the block, the error is not amplified and the average error probability is about 0.

Hereinafter, a setting of the error probability, which is associated with the suggested single layer secure coding is explained in detail. In order to efficiently accomplish security in a real system, it may not be sufficient to set only an average bit error probability of an output end to about 0.5. First, an average bit error probability $\overline{P}_b$ may be given as follows.

$$\overline{P}_b \geq P_b^{SPN}(\text{given one input bit error}) \times P_{err}^L \quad \text{[Equation 65]}$$

In this case, a given one input bit error ($P_b^{SPN}$) represents an error amplification effect according to SPN. Further, $P_{err}^L$ represents a lower limit of a block error probability in the unintended receiver given according to strong converse of an information theory. The transmitter adjusts a transmission rate and transmission power so that the $P_{err}^L$ becomes about 1. When a codeword in a transmission end is given as complex Gaussian distribution, the $P_{err}^L$ is given as follows.

$$P_{err}^L = 1 - \exp\left(-n\left(-\ln\left(1 + \frac{p|h_e|^2}{\sigma_e^2(1+\rho'(R))}\right)\right)^{-\rho'(R)} - \rho'(R)R\right) \quad \text{[Equation 66]}$$

In next two examples, an average bit error probability in an output end of the system is 0.495.

Example 1

Consider a case of $P_b^{SPN}=0.5$ and a case of $P_{err}^L=0.99$ based on
a theoretical SPN. In this case, an average bit error probability is 0.495.

$$P_b^{SPN}=0.5 \text{ and } P_{err}^L=0.99 \rightarrow \overline{P}_b \geq 0.495 \quad \text{[Equation 67]}$$

In a case of this example, since the average bit error probability is 0.495 which is very similar to 0.5, it may be considered that the system is sufficiently safe. However, since the block error probability is 0.99, a block error does not occur in a block of 1%. That is, the unintended receiver may completely decode data of 1%. As a result, it may be not determined that the system is sufficiently safe.

Example 2

Consider a case of $P_b^{SPN}=0.495$ and a case of $P_{err}^L=0.99999999$. In this case, an average bit error probability is 0.495.

$$P_b^{SPN}=0.495 \text{ and } P_{err}^L=0.99999999 \rightarrow \overline{P}_b \geq 0.495 \quad \text{[Equation 68]}$$

In a case of the example 2, an average bit error probability is 0.495. What is different from the example 1 is that the $P_b^{SPN}$ is 0.495 which is slightly less than 0.5. However, when the bit error probability is 0.5 and 0.495, the system is very safe. This example is advantageous that the block error probability is very high so that a block error does not occur in only a block of 0.000001%. The unintended receiver may completely decode data of 0.000001%. Such a system may be sufficiently safe.

As described in above example, in order to sufficiently and stably transmit data by the suggested scheme by the present invention, the average bit error probability is controlled to be about 0.5 and the $P_{err}^L$ is controlled to be about 1. In order to make $P_{err}^L$ to be 1, the length n of the code may be sufficiently increased.

However, since the length of the code is limited due to transmission delay or complexity, a transmission rate R may be increased greater than a channel capacity of the unintended receiver. However, R may not be greater than the channel capacity of the intended receiver. In this case, the transmission power p may be additionally increased. As a result, the system should be designed so that the average bit error probability is equal to 0.5 and $P_{err}^L$ is equal to 1 to the highest degree by suitably adjusting n, R, and p.

Figure 13:
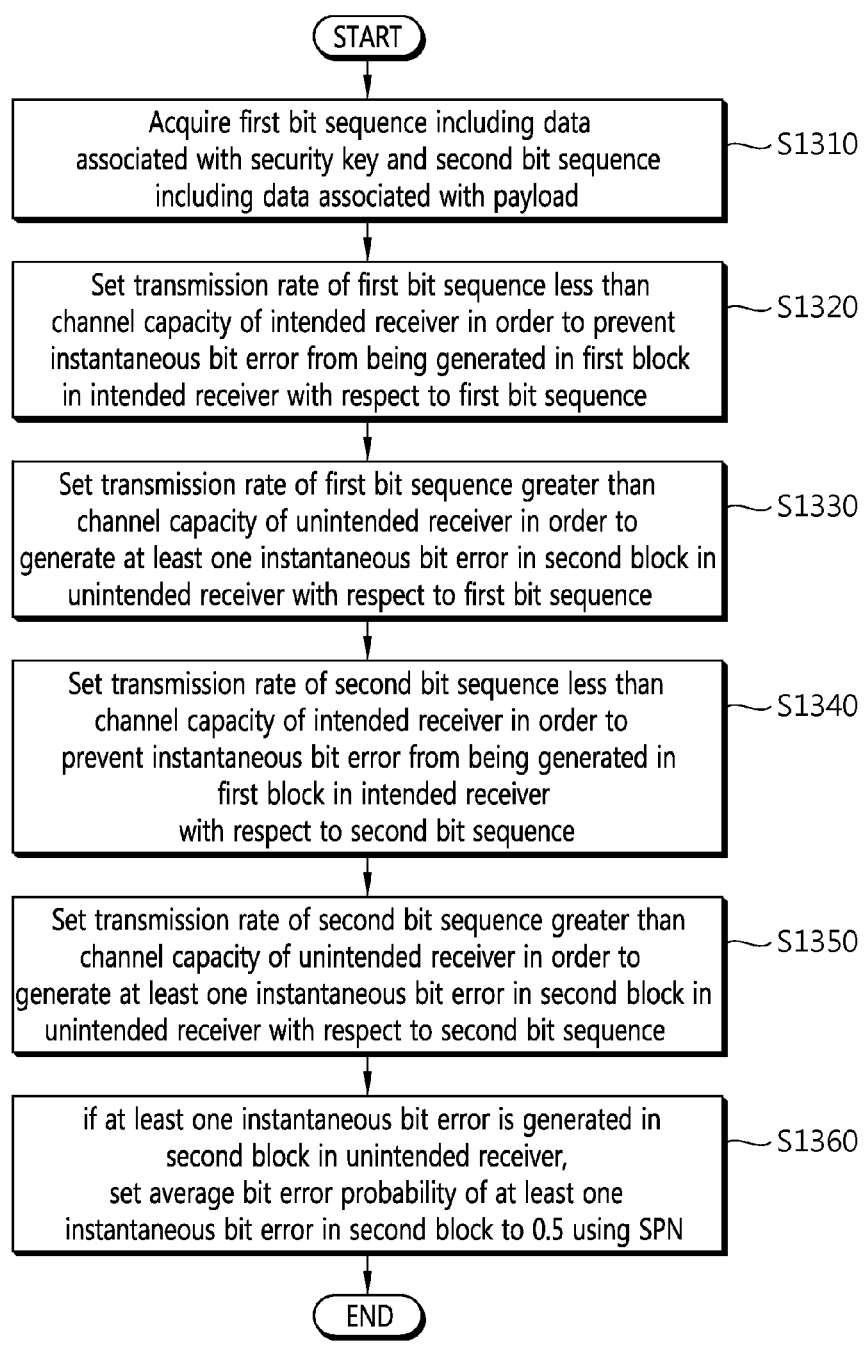
FIG. 13 is a flowchart illustrating a data transmission security method using double layer secure coding.

FIG. 13 is a flowchart illustrating a data transmission security method using double layer secure coding. The method may be performed by a transmission end.

Referring to FIG. 13, in step S1310, the transmission end acquires a first bit sequence and a second bit sequence as input. The double layer secure coding means not to implement security with only one data but means to implement security by receiving two data and dividing the data into two layers to perform encoding/decoding by a transmission end. The first bit sequence serves as a security key and corresponds to randomly generated data. The second bit sequence corresponds to data associated with a payload having substantial information. In this case, the security key means an encrypted key which a transmitter and a receiver previously have. The transmitter performs encryption and the receiver performs re-encryption through the encrypted key to transmit/receive desired data between each other. However, the present invention may implement data security between the transmitted and an intended receiver by using the first bit sequence without the security key. Further, the first bit sequence and the second bit sequence have the relationship that a certain receiver may decode the second bit sequence without error only when the first bit sequence is decoded without error.

In step S1320, in order to prevent a instantaneous bit error from being generated in a first block in the intended receiver, the transmission end sets a transmission rate of the first bit sequence to be less than channel capacity of the intended receiver. In this case, the instantaneous bit error represents an error with respect to an individual bit in a block for the purpose of being discriminated from an average bit error hereinafter. The average bit error signifies an average error with respect to all bits in a block. Further, a first block and a second block are expressed in order to distinguish a data block in an intended receiver from a data block in an unintended receiver. The channel capacity means the highest rate to which a reliable commutable data unit is transmitted. A bit error is generated in the unintended received and the bit error is not generated in the intended receiver using a characteristic in that the bit error is generated when a transmission rate of the bit sequence is greater than the channel capacity and the bit error is not generated when the transmission rate of the bit sequence is less than the channel capacity. In step S1320, the channel capacity of the intended receiver with respect to the first bit sequence is given as $C_b^A$ which is expressed by a following equation 69.

$$C_b^A = \ln\left(1 + \frac{P_A|h_b|^2}{P_B|h_b|^2 + \sigma_b^2}\right) \quad \text{[Equation 69]}$$

In step S1330, in order to generate at least one instantaneous bit error in a second block in the unintended receiver, the transmission end sets the transmission rate of the first bit sequence greater than the channel capacity of the unintended receiver. In this case, the channel capacity of the unintended receiver with respect to the first bit sequence is given as $C_e^A$ which is expressed by a following equation 70.

$$C_e^A = \ln\left(1 + \frac{P_A|h_e|^2}{P_B|h_e|^2 + \sigma_e^2}\right)$$ [Equation 70]

In step S1340, in order to prevent a instantaneous bit error from being generated in the first block in the intended receiver, the transmission end sets a transmission rate of the second bit sequence to be less than channel capacity of the intended receiver. In this case, the channel capacity of the intended receiver with respect to the second bit sequence is given as $C_b^B$ which is expressed by a following equation 71.

$$C_b^B = \ln\left(1 + \frac{P_B|h_b|^2}{\sigma_b^2}\right)$$ [Equation 71]

In step S1350, in order to generate at least one instantaneous bit error in the second block in the unintended receiver, the transmission end sets the transmission rate of the second bit sequence greater than the channel capacity of the unintended receiver. In this case, the channel capacity of the unintended receiver with respect to the second bit sequence is given as $C_e^B$ which is expressed by a following equation 72.

$$C_e^B = \ln\left(1 + \frac{P_B|h_e|^2}{\sigma_e^2}\right)$$ [Equation 72]

In step S1360, if at least one instantaneous bit error is generated in the second block in the unintended receiver, the transmission end sets an average bit error probability of at least one instantaneous bit error in the second block to 0.5 using a SPN (Substitution-Permutation Network. If at least one instantaneous bit error is generated in the block, data cannot be stably transmitted. That is because remaining bits in a block of the unintended receiver cannot be decoded without error. Accordingly, so as to stably transmit data, an average bit error probability in the unintended receiver is set to 0.5 by amplifying a bit error using the SPN. The SPN is an error amplifier including an S-box (substitution-box) and a P-box (permutation-box). The average bit error probability is calculated by amplifying the bit error by passing an input bit including at least one instantaneous bit error in the unintended receiver in the S-box and the P-box. First, the input bit passes through the S-box, and an output bit of the S-box passes through the P-box. The bit passing through the P-box repeatedly passes through the S-box and the P-box so that the bit error is amplified. In detail, the S-box sets an error probability of an output bit of the S-box to 0.5 by amplifying an error of an input bit including at least one instantaneous bit error in the second block. The P-box interleaves a bit output from the S-box. A procedure of repeatedly passing the input bit through the S-box and the P-box refers to a round. In general, the longer a length of an input bit sequence is, the more the SPN has a round. However, if the P-box is configured using linear transformation, although the length of the input bit sequence is increased, the SPN may have a smaller number of rounds. If the input bit of the P-box is set as b=(b1, . . . , bn), the linear transformation calculates U using an input bit of the P-box as expressed by a following equation 73.

$$U = b_1 \oplus b_2 \oplus \ldots \oplus b_n$$ [Equation 73]

A $\hat{b}$ is generated using a following equation 74 by performing an XOR operation with respect to the UE and the input bit of the P-box.

$$\hat{b} = (\hat{b}_1, \cdots, \hat{b}_n)$$
$$= (b_1 \oplus U, \cdots, b_n \oplus U)$$ [Equation 74]

In this case, the linear transformation may be performed by generating an output bit of a P-box by permutating the $\hat{b}$. In addition, security of the second bit sequence may be further reinforced using the SPN in the above double layer secure coding system. The above double layer secure coding system uses a bit error amplifier in the first bit sequence in order to randomize a code book $C_B$. The present invention further amplifies the bit error in the second bit sequence using the SPN. In this case, a bit error is amplified in both of the first bit sequence and the second bit sequence so that data cannot be received in the unintended receiver without error. An actually decoded average bit error probability becomes 0.5.

As a result, the present invention performs the above procedures. Accordingly, an error is scarcely generated in a block in a case of the intended receiver so that an average bit error probability is zero and an average bit error probability of the unintended receiver becomes 0.5, thereby efficiently accomplishing data transmission security in a real system. However, FIG. 13 is illustrative purpose only an example of the present invention. Accordingly, the present invention is not limited to a concrete order of FIG. 13.

Figure 14:
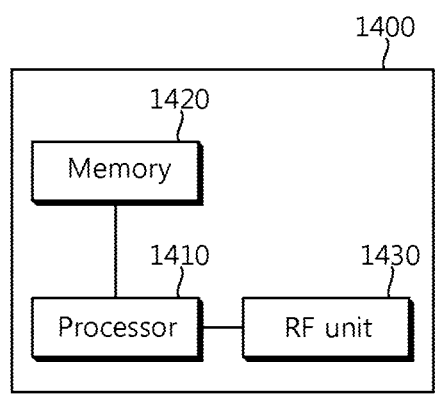
FIG. 14 is a block diagram illustrating a transmitter for implementing security of data transmission using double layer secure coding.

FIG. 14 is a block diagram illustrating a transmitter for implementing security of data transmission using double layer secure coding.

FIG. 14 illustrates an example of an apparatus to which the above method is applied. The above method may implement a transmitter 1400 as a device for implementing security of data transmission using double layer secure coding. The transmitter 1400 may transmit data to a desired receiver.

The transmitter 1400 includes a processor 1410, a memory 1420, and a radio frequency (RF) unit 1430. The processor 1410 may allocate a radio resource according to externally provided information and previously internally stored information. The processor 1410 performs the proposed functions, processes and/or methods in the transmitter 1400. The memory 1420 is connected to the processor 1410 to store various information for driving the processor 1410. The RF unit 1430 is connected to the processor 1410, and sends and receives radio signals.

The processor 1410 may include Application-Specific Integrated Circuits (ASICs), other chipsets, logic circuits, and/or data processors. The memory 1420 may include Read-Only Memory (ROM), Random Access Memory (RAM), flash memory, memory cards, storage media and/or other storage devices. The RF unit 1430 may include a baseband circuit for processing a radio signal. When the above-described embodiment is implemented in software, the above-described scheme may be implemented using a module (process or function) which performs the above function. The module may be stored in the memory 1420 and executed by the processor 1410. The memory 1420 may be disposed to the processor 1410 internally or externally and connected to the processor 1410 using a variety of well-known means.

The above method and apparatus may be implemented by software, hardware or a combination thereof. According to hardware implementation, various embodiments of the present invention may be implemented using at least one of Application Specific Integrated Circuits (ASIC), digital signal processors (DSP), programmable logic devices (PLD), field programmable gate arrays (FPGA), processors, controllers, micro-controllers, microprocessors, other electric unit, and a combination thereof. According to the software implementation, the embodiments may be implemented by a module for performing the above function. The software may be stored in a memory unit and executed by the processor. The memory unit and the processor may adopt various devices which are well known to those skilled in the art.

What is claimed is:

1. A data security method by a transmission end using double layer coding in a wireless communication system, the method comprising:
    acquiring a first bit sequence including data associated with a security key and a second bit sequence including data associated with a payload as input;
    setting a transmission rate of the first bit sequence less than channel capacity of an intended receiver in order to prevent an instantaneous bit error from being generated in a first block in the intended receiver with respect to the first bit sequence;
    setting the transmission rate of the first bit sequence greater than channel capacity of an unintended receiver in order to generate at least one instantaneous bit error in a second block in the unintended receiver with respect to the first bit sequence;
    setting a transmission rate of the second bit sequence less than the channel capacity of the intended receiver in order to prevent the instantaneous bit error from being generated in the first block in the intended receiver with respect to the second bit sequence;
    setting the transmission rate of the second bit sequence greater than the channel capacity of the unintended receiver in order to generate at least one instantaneous bit error in the second block in the unintended receiver with respect to the second bit sequence; and
    if at least one instantaneous bit error is generated in the second block in the unintended receiver, setting an average bit error probability of the at least one instantaneous bit error in the second block to 0.5 using a Substitution-Permutation Network (SPN),
    wherein the first bit sequence is used to decode the second bit sequence,
    the average bit error probability is calculated by repeatedly performing a step of passing an input bit including at least one instantaneous bit error in the second block through an S-box (substitution-box) and a P-box (permutation-box) included in the SPN preset times,
    the S-box sets an error probability of an output bit of the S-box to 0.5 by amplifying an error of an input bit including at least one instantaneous bit error in the second block, and
    the P-box interleaves the output bit of the S-box.

2. The method of claim 1, wherein the channel capacity of the intended receiver with respect to the first bit sequence is given as $C_b^A$ as expressed by a following equation, $$C_b^A = \ln\left(1 + \frac{P_A|h_b|^2}{P_B|h_b|^2 + \sigma_b^2}\right)$$

the channel capacity of the unintended receiver with respect to the first bit sequence is given as $C_e^A$ as expressed by a following equation, $$C_e^A = \ln\left(1 + \frac{P_A|h_e|^2}{P_B|h_e|^2 + \sigma_e^2}\right)$$

the channel capacity of the intended receiver with respect to the second bit sequence is given as $C_b^B$ as expressed by a following equation, $$C_b^B = \ln\left(1 + \frac{P_B|h_b|^2}{\sigma_b^2}\right)$$

the channel capacity of the unintended receiver with respect to the second bit sequence is given as $C_e^B$ as expressed by a following equation, $$C_e^B = \ln\left(1 + \frac{P_B|h_e|^2}{\sigma_e^2}\right)$$

where, the $P_A$ represents transmission power of the first bit sequence, the $P_B$ represents transmission power of the second bit sequence, the $h_b$ represents a channel of the intended receiver, the $h_e$ represents a channel of the unintended receiver, the $\sigma_b^2$ represents distribution of white Gaussian noise of the intended receiver, and the $\sigma_e^2$ represents distribution of white Gaussian noise of the unintended receiver.

3. The method of claim 1, wherein the acquiring of the second sequence as the input further comprises amplifying the second bit sequence using the SPN.

4. The method of claim 1, wherein the P-box uses linear transformation,
    the linear transformation calculates U using input bits b=(b1, ..., bn) of the P-box as expressed by a following equation, $$U = b_1 \oplus b_2 \oplus \ldots \oplus b_n$$

$\hat{b}$ is generated by performing XOR operation of the U and the input bits as expressed by a following equation, $$\hat{b} = (\hat{b}_1, \cdots, \hat{b}_n)$$
$$= (b_1 \oplus U, \cdots, b_n \oplus U)$$

an output bit of the P-box is generated by permutating the $\hat{b}$.

5. A data security method by a transmission end using single layer coding in a wireless communication system, the method comprising:
    acquiring a bit sequence as input;
    setting a transmission rate of the bit sequence less than channel capacity of an intended receiver in order to prevent an instantaneous bit error from being generated in a first block in the intended receiver with respect to the bit sequence;
    setting the transmission rate of the bit sequence greater than channel capacity of an unintended receiver in order to generate at least one instantaneous bit error in a second block in the unintended receiver with respect to the bit sequence;
    if at least one instantaneous bit error is generated in the second block in the unintended receiver, setting an average bit error probability of the at least one instantaneous bit error in the second block to 0.5 using a Substitution-Permutation Network (SPN); and setting an instantaneous bit error in the second block in the unintended receiver to 1 by increasing a transmission power of the bit sequence;

the average bit error probability is calculated by repeatedly performing a step of passing an input bit including at least one instantaneous bit error in the second block through an S-box (substitution-box) and a P-box (permutation-box) included in the SPN preset times, the S-box sets an error probability of an output bit of the S-box to 0.5 by amplifying an error of an input bit including at least one instantaneous bit error in the second block, and the P-box interleaves the output bit of the S-box.

6. The method of claim 5, wherein the P-box uses linear transformation, the linear transformation calculates U using input bits b=(b1, . . . , bn) of the P-box as expressed by a following equation, $$U = b_1 \oplus b_2 \oplus \ldots \oplus b_n$$

$\hat{b}$ is generated by performing XOR operation of the U and the input bits as expressed by a following equation, $$\hat{b} = (\hat{b}_1, \cdots, \hat{b}_n)$$
$$= (b_1 \oplus U, \cdots, b_n \oplus U)$$

an output bit of the P-box is generated by permutating the $\hat{b}$.

* * * * *